No. 706,917. Patented Aug. 12, 1902.
H. W. FINCH.
SPLIT PULLEY.
(Application filed Dec. 19, 1901.)
(No Model.)

Witnesses
F. S. Maguire
R. J. Beall

Hosea W. Finch,
Inventor,
by John B. Thomas & Co.,
Attorneys.

UNITED STATES PATENT OFFICE.

HOSEA W. FINCH, OF TACOMA, WASHINGTON.

SPLIT PULLEY.

SPECIFICATION forming part of Letters Patent No. 706,917, dated August 12, 1902.

Application filed December 19, 1901. Serial No. 86,565. (No model.)

*To all whom it may concern:*

Be it known that I, HOSEA W. FINCH, a citizen of the United States, and a resident of Tacoma, in the county of Pierce and State of Washington, have invented certain new and useful Improvements in Split Pulleys, of which the following is a specification.

This invention is an improvement in split pulleys, and relates more especially to the provision of peculiar means for attaching the pulley to the shaft, whereby the turning of the shaft within the box or hub of the pulley will insure a positive engagement therewith and cause the pulley to revolve with the shaft.

The invention contemplates a construction and arrangement of parts which will provide a shaft-grip for pulleys that shall be cheap and simple in construction, effective in operation, and strong and durable.

The invention consists in the particular construction and combination of the parts, all as will be hereinafter fully described, and more specifically set forth in the appended claim.

Figure 1:
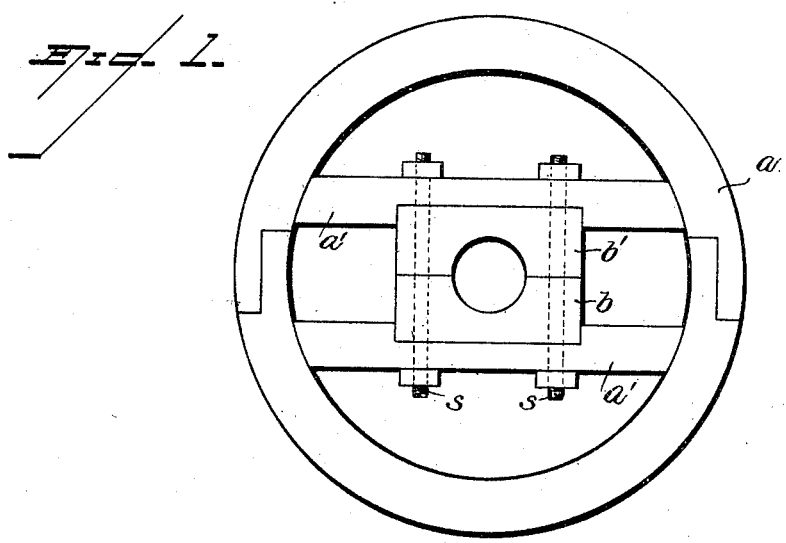
Figures 2, 3:
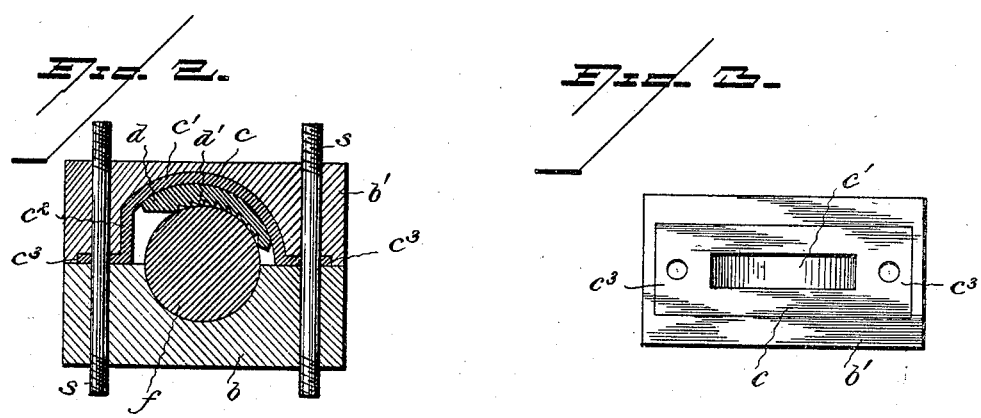
Figure 4:
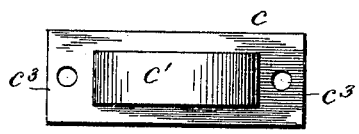

In the accompanying drawings, which form a part of this specification, and in which like letters of reference indicate like parts in the several views, Figure 1 is an elevation of a split pulley embodying my invention. Fig. 2 is an enlarged sectional view. Fig. 3 is a detail view of the wear-plate and part of the hub to which it is attached. Fig. 4 is a detail view of the wear-plate or casing.

Referring to said drawings, the letter $a$ designates the rim of the pulley, $a'$ the spoke-arms, and $b\ b'$ the box or hub, said box or hub being adapted to receive the shaft upon which the pulley is to be mounted.

In carrying out my invention the hub or box is made up of two parts, $b$ and $b'$, which fit together and are clamped between the spoke-arms $a'$ by means of the bolts $s$, the said spoke-arms being slightly recessed, as shown, to receive the ends of the box or hub. The bolts $s$ also serve to hold in place the wear-plate, hereinafter described. The inner side of the part $b$ of the hub is provided transversely with a concave recess, which forms a seat for the shaft $f$, while the inner side of the other part of the hub is recessed to receive the wear-plate or metal casing $c$ and wedge-piece $d$, the said recess being shaped to correspond with the wear-plate, which fits the same closely. This wear-plate is shaped to form a curved wall $c'$ eccentric to the shaft and joined at its outer end to a contiguous straight wall $c^2$, which forms an abutment for the wide end of the wedge-plate. The end portions $c^3$ of the wear-plate are pierced for the passage of the bolts $s$, hereinbefore referred to. It will be noted that the curved wall of the wear-plate forms a tapering recess around one side of the shaft and that the wider end of said recess is contracted by the straight wall $c^2$. In this tapered recess fits the curved wedge-piece $d$, forming a locking-key by which the pulley is securely attached to the shaft. The concave surface of this wedge-piece or key is provided with teeth $d'$ to insure the proper engagement with the shaft.

The rim of the pulley is split or divided into two parts, each having a spoke-arm $a'$, so that the pulley may be separated in placing the same upon the shaft. When the parts are assembled upon the shaft and connected by the bolts, as shown in the drawings, the turning of the shaft in the direction indicated by the arrow will carry the key into the smaller end of the tapered recess and wedge it tightly, locking the parts firmly together, so that the pulley will rotate with the shaft. When it is desired to move the pulley to another location on the shaft, it is only necessary to turn the pulley backward, which will loosen the key or wedge and permit the pulley to be slid along the shaft, and when the shaft is again started the pulley will be automatically locked in engagement therewith.

The devices herein shown and described provide a very simple and effective means for attaching a split pulley to a shaft, and as the parts are positive in their operation there is no chance of the pulley becoming loose upon the shaft.

The straight wall $c^2$ forms a contracted space at the wider end of the tapered recess, in which the wedge or key works, so that the movement of the wedge is limited in this direction, and also to provide a space in which a tool may be inserted to force the wedge into the narrow end of the recess in case it is not moved by the shaft.

Having thus described my invention, I claim—

In a split pulley, the combination with the segment-rims $a$ $a$ provided with cross-arms or spokes $a'$ each having a recess at its inner side, of the two-part box or hub fitting between the arms in the recesses thereof and having registering bolt-holes, said parts also having transverse recesses in their contiguous sides for the shaft and one of the parts further recessed centrally, a metal casing seated in the said central recess and provided with an eccentrically-curved wall terminating at one end in a straight wall, said casing being also provided with a flange projecting from the open end thereof and provided with holes registering with the aforesaid bolt-holes in the hub, and bolts passed through the parts for clamping them together; together with a curved wedge-piece having teeth on its concave edge adapted to engage the shaft, said wedge-piece being located in the casing to impinge against the curved wall thereof.

In testimony whereof I affix my signature in the presence of two witnesses.

HOSEA W. FINCH.

Witnesses:
E. E. WHITE,
PETER DAVID.